United States Patent
Green

(10) Patent No.: US 6,926,877 B2
(45) Date of Patent: Aug. 9, 2005

(54) PROCESS AND APPARATUS FOR PRODUCING CARBON BLACKS

(75) Inventor: Martin C. Green, Boxbrough, MA (US)

(73) Assignee: Cabot Corporation, Boston, MA (US)

(*) Notice: Subject to any disclaimer, the term of this patent is extended or adjusted under 35 U.S.C. 154(b) by 311 days.

(21) Appl. No.: 09/730,708

(22) Filed: Dec. 6, 2000

(65) Prior Publication Data

US 2001/0026786 A1 Oct. 4, 2001

Related U.S. Application Data

(63) Continuation of application No. PCT/US99/13042, filed on Jun. 9, 1999.
(60) Provisional application No. 60/088,620, filed on Jun. 9, 1998.

(51) Int. Cl.[7] .................................................. C09C 1/48
(52) U.S. Cl. .................................... 423/449.1; 423/458
(58) Field of Search ............................. 423/449.1, 458, 423/450

(56) References Cited

U.S. PATENT DOCUMENTS

| | | | |
|---|---|---|---|
| 2,785,964 A | 3/1957 | Pollock | 23/314 |
| 3,401,020 A | 9/1968 | Kester et al. | 23/209.4 |
| 3,607,058 A | 9/1971 | West et al. | 23/209.4 |
| 3,761,577 A | 9/1973 | Dahmen et al. | 423/450 |
| 3,887,690 A | 6/1975 | West et al. | 423/456 |
| 3,922,335 A | 11/1975 | Jordan et al. | 423/450 |
| 3,922,355 A | 11/1975 | Kotthoff | 426/250 |
| RE28,974 E | 9/1976 | Morgan et al. | 423/450 |
| 4,105,750 A | 8/1978 | Horn et al. | 423/456 |
| 4,206,192 A | 6/1980 | Austin | 423/455 |
| 4,272,487 A | 6/1981 | Austin | 422/150 |
| 5,190,739 A | 3/1993 | MacKay et al. | 423/450 |

FOREIGN PATENT DOCUMENTS

| | | | |
|---|---|---|---|
| GB | 1530315 | 10/1978 | B01J/1/10 |
| WO | WO 93/18094 | 9/1993 | C09C/1/50 |

*Primary Examiner*—Stuart Hendrickson

(57) ABSTRACT

The present invention provides processes for introducing a fluid stream into a carbon black reactor and for producing carbon black. According to the present invention a fluid stream comprising an oxidant; nitrogen, hydrogen a hydrocarbonaceous material or mixtures thereof is introduced into the effluent flowing through a carbon black reactor in an axial direction.

9 Claims, 3 Drawing Sheets

US 6,926,877 B2

PROCESS AND APPARATUS FOR PRODUCING CARBON BLACKS

This application is a continuation of PCT/US99/13042 filed 9 Jun. 1999, which claims the benefit under 35 U.S.C. § 119 of U.S. Provisional Patent Application No. 60/088,620 filed 9 Jun. 1998.

FIELD OF INVENTION

The present invention relates to new processes and apparatus for producing carbon blacks.

BACKGROUND

Carbon blacks may be utilized as pigments, fillers, reinforcing agents, and for a variety of other applications, and are widely utilized as fillers and reinforcing pigments in the compounding and preparation of rubber compositions and plastic compositions. Carbon blacks are generally characterized on the basis of their properties including, but not limited to, their surface areas, surface chemistry, aggregate sizes, and particle sizes. The properties of carbon blacks are analytically determined by tests known to the art, including iodine adsorption surface area ($I_2$ No), nitrogen adsorption surface area ($N_2$ SA), dibutyl phthalate adsorption (DBP), dibutyl phthalate adsorption of crushed carbon black (CDBP), cetyl-trimethyl ammonium bromide absorption value (CTAB) and Tint value (TINT).

Carbon blacks may be produced in a furnace-type reactor by pyrolyzing a hydrocarbon feedstock with hot combustion gases to produce combustion products containing particulate carbon black. A variety of methods for producing carbon blacks are generally utilized.

In one type of carbon black reactor, such as shown in U.S. Pat. No. 3,401,020 to Kester et al., or U.S. Pat. No. 2,785,964 to Pollock, hereinafter "Kester" and "Pollock" respectively, a fuel, preferably hydrocarbonaceous, and an oxidant, preferably air, are injected into a first zone and react to form hot combustion gases. A hydrocarbon feedstock in either gaseous, vapor or liquid form is also injected into the first zone whereupon pyrolysis of the hydrocarbon feedstock commences with consequent formation of carbon black. In this instance, pyrolysis refers to the thermal decomposition of a hydrocarbon. The resulting combustion gas mixture, in which pyrolysis is occurring, then passes into a reaction zone where completion of the carbon black forming reactions occurs.

Another type of process equipment utilized to produce carbon blacks is referred to as a modular or staged reactor. Modular (staged) furnace carbon black reactors are generally described in U.S. Pat. Reissue No. 28,974 and U.S. Pat. No. 3,922,355, the disclosures of which are hereby incorporated by reference.

In certain carbon black production processes a portion of the overall oxidant introduced in the process is introduced downstream of the point of feedstock injection. U.S. Pat. No. 4,105,750 discloses a process for producing carbon blacks with lower structure, as reflected by lower dibutyl phthalate (DBP) absorption numbers, for a given particle size. In the disclosed process a portion of the oxidant introduced in the process is injected at a location downstream of the point of feedstock injection.

WO 93/18094 discloses a process for producing carbon blacks characterized as adding a secondary oxidant stream to the reactor such that the secondary oxidant stream does not interfere with the formation of carbon black particles and aggregates in the reactor. In the disclosed examples the DBP absorption numbers of the carbon black produced utilizing the secondary oxidant stream were lower than the DBP absorption numbers of the carbon black produced utilizing the same reaction conditions in the absence of the secondary oxidant stream.

Other patents such as U.S. Pat. Nos. 3,607,058; 3,761,577; and 3,887,690 also describe the processes for producing carbon black.

The temperatures in a carbon black reactor can range between 2400° F. (1315° C.) and 3000° F. (1648° C.) or greater. The injection of additional oxidant, and/or secondary air into the reaction stream, for example, in the manner described in the aforementioned patents, will generally raise the temperature of the reaction stream, and may raise the temperature of the reaction stream in the region local to the point of air injection to well above 3000° F (1648°C.). This temperature extreme may cause damage to the refractory lining of the reactor and/or shorten the useful life of the refractory lining of the reactor, particularly near the area of additional oxidant injection.

Accordingly, it would be advantageous to have a method and apparatus for adding additional oxidant and/or hydrocarbon containing fluid streams into the effluent which minimized refractory problems in the reactor.

It would also be advantageous to have a method and apparatus for producing carbon blacks wherein the introduction of additional oxidant and/or hydrocarbon containing fluid streams into the effluent increased the structure of the carbon blacks produced by the process, as evidenced by the carbon blacks having an increased DBP absorption value for a given surface area.

The process and apparatus of the present invention achieve the aforementioned advantages in addition to other advantages that will become apparent to those of ordinary skill in the art from the following description.

Although general types of furnace carbon black reactors and processes have been described, it should be understood that the present invention can be used in any other furnace carbon black reactor or process in which carbon black is produced by pyrolysis and/or incomplete combustion of hydrocarbons.

SUMMARY OF THE INVENTION

The present invention provides processes and apparatus particularly well suited for use in the production of carbon blacks.

An aspect of the present invention are processes and apparatus for sheathing a gaseous stream. A process for sheathing a gaseous stream may comprise introducing a fluid stream around the outer periphery of the gaseous stream. An apparatus for sheathing a gaseous stream may comprise a hollow vessel, an inlet for introducing the fluid stream into the interior of the vessel and an outlet to allow the fluid stream to exit the vessel. The outlet may comprise an annulus, or a plurality of jets. Preferably the vessel is annular, i.e. in the shape of a ring, although other shapes are possible. The annulus or outlet jets may be disposed around the circumference of the vessel.

In a further aspect, the present invention provides a process for producing carbon blacks that includes sheathing the gaseous stream flowing through the reactor with a fluid stream. The gaseous stream in a reactor may comprise a combustion gas stream and/or an effluent stream, formed by introduction of a carbon black yielding feedstock into the combustion gas stream. The sheathing preferably occurs after introduction of feedstock into the combustion gas stream. The fluid stream preferably surrounds the outer perimeter of a combustion gas stream and/or effluent disposing the fluid stream between the combustion gas stream and/or effluent and a reactor wall.

In a further aspect, the present invention provides processes for producing carbon black. According to the present invention a process for producing carbon black includes introducing a fluid stream in an axial direction into a reactor after the point of feedstock injection. The fluid stream may be introduced in the manner described above.

In another aspect the present invention provides a process for producing carbon blacks wherein a fluid stream is introduced into a carbon black reactor after the point of feedstock injection, the process comprising: introducing the fluid stream in an axial direction.

In a process of the present invention the fluid stream may be added through an annulus or a plurality of jets in the axial direction. The annulus is concentric to introduce the fluid stream around a periphery of a process stream. The plurality of jets may be disposed in a ring or in multiple rings. The axial direction refers to a direction parallel to the direction of flow of combustion gases through the reactor. For a cylindrical reactor the axial direction is generally parallel to the axis of the cylinder. As used in the process sense, a "jet" refers to a strong well-defined stream of fluid issuing from an orifice or nozzle.

These aspects of the present invention, and the features discussed below provide a means for sheathing the combustion gas stream and carbon black feedstock mixture (effluent) exiting the second stage of a modular carbon black reactor. In a preferred embodiment of the present invention it is generally preferred that the annulus or jets by which the fluid stream is introduced into the reactor are disposed so as to surround the effluent stream. As will be appreciated from the appended figures, the effluent stream may be surrounded through the introduction of the fluid stream around the periphery of the gas stream exiting the second stage of the reactor. The fluid stream introduced into the reactor may be utilized to at least partially divert the effluent gas stream exiting the second stage away from the walls of the reactor. In this manner, heat damage to the refractory lining of the reactor stage may be minimized.

In particular, an effect of the fluid stream is to counteract the tangentially outward spread of the effluent stream towards the walls of the reactor as the effluent progresses down the reactor. Accordingly, a function of the fluid stream introduced into the reactor is to contain or sheath or redirect the effluent stream so that the temperatures to which the reactor walls are exposed is reduced. Further, introduction of the fluid stream in the manner contemplated by the present invention produces a more uniform mixing than other methods, thereby minimizing high local temperatures.

In a further aspect, the present invention provides an apparatus for introducing a fluid stream into a carbon black reactor. An apparatus of the present invention for introducing a fluid stream into a carbon black reactor comprises a hollow vessel, an inlet for introducing the fluid stream into the interior of the vessel and an outlet for the fluid stream to exit the vessel. Suitable outlets include an annulus, a jet, a plurality of jets, or mixtures thereof. Preferably, an annulus or a plurality of jets are utilized as an outlet to allow fluid stream to exit the vessel into the reactor. The vessel may be generally annular (in the shape of a ring) or another shapes. The annulus may be disposed concentrically to the inner and outer diameters of the ring, and/or the outlet jets may be disposed around the circumference of the ring. In another possible embodiment the outlet jets may be disposed in concentric circles from an inner portion to the outer periphery of the vessel. The inlet for the fluid stream may be disposed radially or substantially parallel to the outlet (annulus or jets) to produce an exiting fluid stream without significant swirls. Alternatively, the inlet for the fluid stream may be disposed tangentially, or substantially tangentially, to the outlet (annulus or jets) such that the exiting fluid stream includes a tangential velocity component sufficient to create fluid swirls.

The processes of the present invention may be practiced with an apparatus of the present invention, or with other apparatus known in the art or derivable by those of ordinary skill in the art based on the disclosure of the present invention.

In a further aspect the present invention includes an apparatus for producing carbon blacks comprising the apparatus of the present invention for introducing a fluid stream. A preferred apparatus is a modular reactor comprising: a first, or combustion, stage where an oxidant is contacted with a fuel to produce a stream of combustion gases at a temperature sufficient to pyrolyze a carbon black yielding feedstock; a second, or feedstock introduction, stage where a carbon black yielding feedstock is introduced into the combustion gases; and a third, or reaction, stage wherein the mixture of combustion gases and feedstock react to produce carbon black, the reactor further comprising an apparatus for introducing a fluid stream into the second or third stage of the reactor after the point of feedstock injection.

An advantage of the present invention is that the method of introduction of the fluid stream will minimize refractory lining wear generally associated with the introduction of secondary fluid streams into a reactor.

A further advantage of the present invention is that the process for producing carbon blacks of the present invention may be utilized to produce carbon blacks having increased structure, as reflected by increased DBP absorption values, for a given surface area.

Other advantages of the present invention will become apparent from the following more detailed description of the invention.

DETAILED DESCRIPTION OF THE INVENTION

Figure 1:
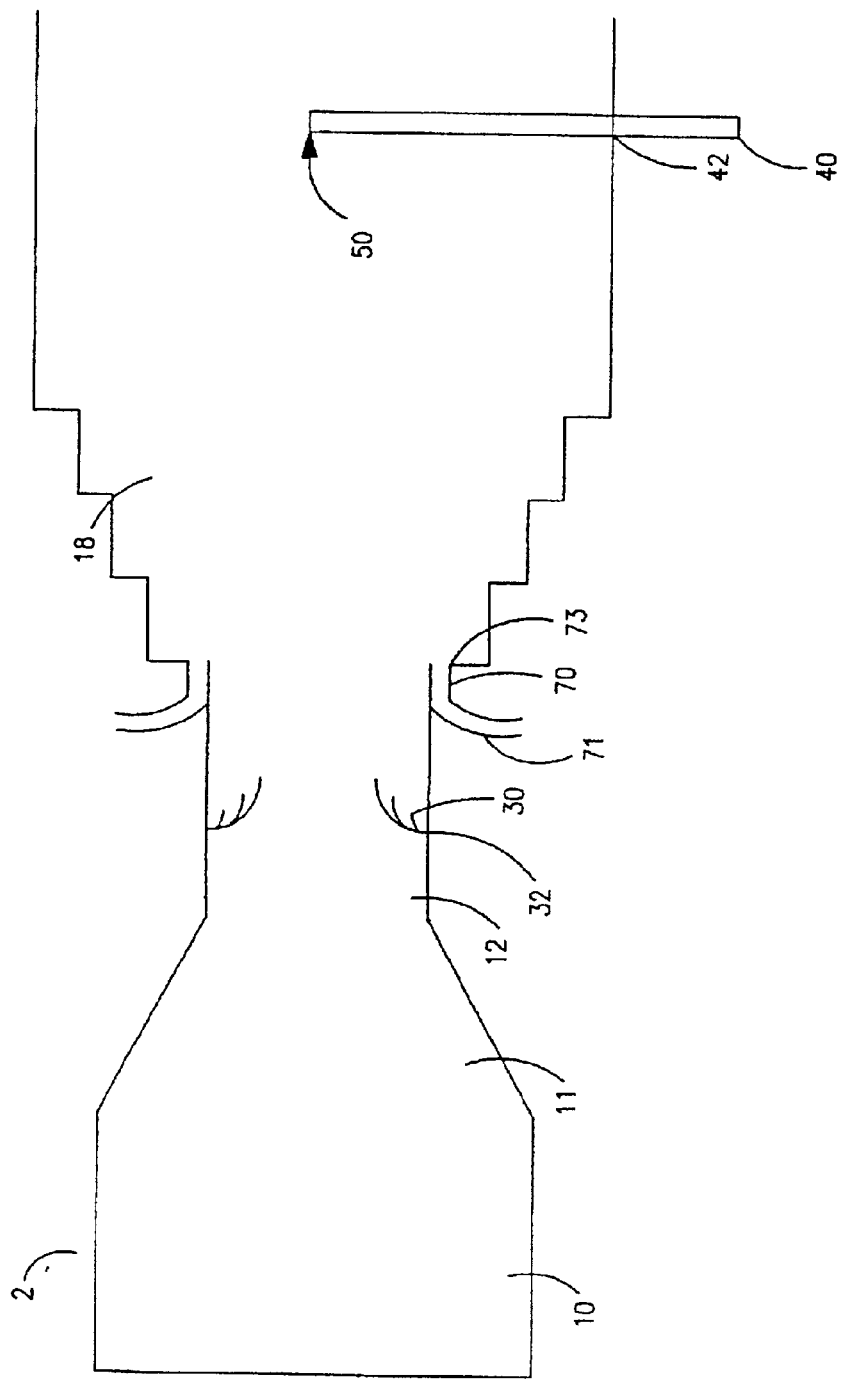
FIG. 1 depicts a cross-sectional view of a portion of a modular furnace carbon black reactor according to an embodiment of the present invention.

The present invention provides processes for sheathing a gas stream in a reactor the processes comprising introducing a fluid stream around the outer periphery of the gas stream. In a carbon black production process, the fluid stream is introduced around the outer periphery of the combustion gas stream and/or effluent stream. The fluid stream is preferably introduced in an axial direction, the axial direction referring to a direction substantially parallel to the overall direction of flow of the gas stream. The fluid stream may be introduced in a co-current direction to the direction of flow of the gas stream or introduced in a counter-current direction. Preferably the fluid stream is introduced in a co-current direction.

The present invention also provides processes for producing carbon black comprising introducing a fluid stream into a gaseous process stream to sheath the gaseous process stream. In a typical carbon black reactor, the introduction may occur downstream of the point of feedstock injection. An embodiment is process for producing carbon black comprising: introducing a fluid stream to sheath a process stream after introduction of a feedstock into the process stream.

The process may further comprise: introducing the fluid stream in an axial direction, the axial direction referring to a direction substantially parallel to the overall direction of flow of a combustion gas stream/effluent in the reactor. The fluid may be introduced with or without swirls and co-currently or counter-currently.

In a process of the present invention, the introduced fluid stream is preferably a gaseous stream comprising at least one of the following components: an oxidant, nitrogen, hydrogen, a hydrocarbonaceous material or mixtures thereof. An "oxidant" as used herein refers to a composition comprising oxygen, such as atmospheric air, oxygen-enriched air, combustion products of hydrocarbon fuels and air and/or oxygen, or mixtures of these streams. A "hydrocarbonaceous material as used herein refers to a composition comprising a hydrocarbon such as a hydrocarbon fuel, a gas stream including an incompletely combusted hydrocarbon fuel, such as the combustion gas stream from the carbon black production process, or mixtures of these streams.

The present invention also provides an apparatus for practicing the process of the present invention and introducing a fluid stream in an axial manner. An apparatus of the present invention comprises: a hollow vessel, preferably a hollow ring, an inlet or inlets for introducing a fluid stream into the interior of the vessel and at least one outlet to allow the fluid stream to exit from the vessel. The outlet may comprise an annulus, or a plurality of annuli. The outlet may also comprise a jet or a plurality of jets.

The inlet may be disposed radially or in an axial direction substantially parallel to the axial direction of the outlet to produce an outlet stream without significant swirls. Alternatively the inlet may be disposed in a direction tangential to the axial direction of the outlet to produce an outlet stream with swirls. Further details relating to the process and apparatus for introducing a fluid stream into a carbon black reactor are set forth below with reference to the processes and apparatus of the present invention for producing carbon blacks.

According to an embodiment of a process of the present invention, a fluid stream comprising an oxidant, nitrogen, hydrogen, a hydrocarbonaceous material, or mixtures thereof is introduced into the effluent flowing through a carbon black reactor in an axial direction. In one embodiment the fluid stream comprises atmospheric air, with or without, oxygen enrichment. In another embodiment, the fluid stream comprises an industrial gas stream comprising hydrocarbons, hydrogen, carbon monoxide, carbon dioxide and/or steam. An example of an industrial gas stream is tail gas from a carbon black production process.

In one aspect, a process of the present invention for producing carbon black comprises:

a) reacting an oxidant, primary fuel, and carbon black feedstock in a reactor to form an effluent composed of carbon black and combustion gases;

b) injecting a fluid stream into effluent in a direction axial to the direction of the flow of the effluent through the reactor;

c) passing the resulting effluent through the reactor; and d) cooling, separating, and recovering the carbon black product, the fluid stream comprising an oxidant, nitrogen, hydrogen, a hydrocarbonaceous material, or mixtures thereof The introduction of the fluid stream preferably results in the production of carbon blacks having increased structure, as reflected by an increased DBP absorption value, for a given iodine number ($I_2$No.) surface area in comparison to carbon blacks produced utilizing similar process conditions in the absence of the fluid stream introduction.

A process of the present invention may be advantageously performed in a modular type carbon black reactor including at least three stages. With reference to this type of reactor, an embodiment of process of the present invention for producing carbon blacks comprises:

generating a stream of combustion gases in a first stage of a reactor having a velocity sufficient to flow through subsequent stages of the reactor and a temperature sufficient to pyrolyze a carbon black yielding feedstock;

injecting a carbon black yielding feedstock into the combustion gas in a second stage of the reactor to produce an effluent composed of carbon black and combustion gases;

introducing a fluid stream in a direction axial to the flow of the effluent after the injection of carbon black yielding feedstock, the resulting effluent passing through the third stage of the reactor; and cooling, separating, and recovering the carbon black product.

Preferably the fluid stream is introduced in the third stage of the reactor, however as will be recognized by those of ordinary skill in the art the fluid stream may be introduced at any point subsequent to the introduction of feedstock.

The fluid stream may comprise an oxidant, nitrogen, hydrogen, a hydrocarbonaceous material, or mixtures thereof. The introduction of the fluid stream preferably results in the production of carbon blacks having increased structure, as reflected by an increased DBP absorption value, for a given iodine number ($I_2$No.) surface area in comparison to carbon blacks produced utilizing similar process conditions in the absence of the fluid stream introduction.

In a "staged" or "modular" reactor, a liquid or gaseous fuel is reacted with an oxidant, preferably air, in a first stage to form hot combustion gases. This stage has been referred to the "burner" stage, the combustion stage and/or the combustion zone of the reactor.

The hot combustion gases pass from the first stage, downstream into an additional reactor stage or stages. Generally the additional reactor stage(s) includes at least a feedstock injection stage and a reaction stage. The feedstock injection stage may be located between the first (or combustion) stage and the reaction stage and comprise a choke, or zone of restricted diameter, which is smaller in cross section than the combustion stage or the reaction stage. The zone of restricted diameter is also known as the transition zone to those of ordinary skill in the art.

In the production of carbon blacks a hydrocarbonaceous feedstock is injected at one or more points into the path of the hot combustion gas stream in the feedstock injection stage. The feedstock may be injected into the path of the hot combustion gases upstream of, downstream of, and/or in the restricted diameter zone. The hydrocarbonaceous feedstock may be liquid, gas or vapor, and may be the same as or different from the fuel utilized to form the combustion gas stream. Generally the hydrocarbonaceous feedstock is a hydrocarbon oil or natural gas. However, other hydrocarbonaceous feedstocks such as acetylene are known in the art.

Following the point of feedstock introduction, the feedstock is mixed, atomized and vaporized into the combustion gas stream. The mixture of combustion gases and vaporized feedstock then enters a stage of the reactor referred to herein as the reaction stage. Although pyrolysis begins upon injection of the feedstock into the combustion gas stream, the conversion of vaporized hydrocarbon feedstock to carbon black primary particles and aggregates continues in the reaction stage. The residence time of the feedstock, combustion gases, and carbon blacks in the reaction zone of the reactor is sufficient, to allow the formation of carbon blacks. The mixture of combustion gases and carbon blacks in the reaction zone of the reactor is hereinafter referred to, throughout the application, as the effluent. After carbon blacks having the desired properties are formed, the temperature of the effluent is lowered to stop the major reactions. This lowering of temperature of the effluent to stop the major reactions may be accomplished by any known manner, such as by injecting a quenching fluid, through a quench, into the effluent. As is generally known to those of ordinary skill in the art, the major reactions are stopped when the desired carbon blacks have been produced in the reactor, as is determined by sampling the carbon black and testing for analytical properties. After the reactions have been stopped and the effluent sufficiently cooled by any known means, the effluent generally passes through a bag filter, or other separation system to collect the carbon black.

In both types of processes and reactors described above, and in other generally known reactors and processes, the hot combustion gases are at a temperature sufficient to effect pyrolysis of the hydrocarbonaceous feedstock injected into the combustion gas stream. The temperature of the combustion gas stream prior to injection of carbon black yielding feedstock is generally at least 2400° F. (1315° C.). After injection of the carbon black yielding feedstock, the temperature of the process stream will rise and may reach 3000° F. (1648° C.) or higher. In view of these temperatures, and the heat generated by the carbon black production process, reactors for producing carbon black may include linings made from refractory materials capable of withstanding the high temperatures.

A process of the present invention for producing carbon blacks includes means for sheathing the effluent stream as it passes through at least a portion of the reactor. By way of example, with reference to a modular carbon black reactor, a process of the present invention may comprise:

generating a stream of combustion gases in a first stage of a reactor having a velocity sufficient to flow through subsequent stages of the reactor and a temperature sufficient to pyrolyze a carbon black yielding feedstock;

injecting a carbon black yielding feedstock into the combustion gas stream in a second stage of the reactor to produce an effluent composed of carbon black and combustion gases;

sheathing the effluent stream as the effluent stream exits the second stage of the reactor, the sheathed effluent stream passing through the third stage of the reactor; and cooling, separating, and recovering the carbon black product.

The step of sheathing the effluent stream will preferably divert the effluent stream from the walls of the third stage of the reactor, at least at the point of initial sheathing. The means for sheathing the effluent stream may comprise introducing a fluid stream in a direction axial to the flow of the effluent to surround the effluent stream exiting the second stage of the reactor.

A cross-sectional view of a type of reactor in which the process of the present invention may be practiced is depicted in FIG. 1. As will be understood, the process of the present invention does not require any modification of the carbon black reactor, other than the provision of a means for injecting the oxidant-containing stream, and therefore may be practiced in other types of carbon black reactors, such as the types generally discussed in the Background section.

One embodiment of a modular apparatus for producing carbon black of the present invention comprises:

a combustion zone having an upstream and a downstream end and at least one port to allow the introduction of a fuel and an oxidant;

a zone of converging diameter having an upstream and a downstream end and converging from the upstream end towards the downstream end, the upstream end being connected to the downstream end of the combustion zone;

a transition zone having an upstream and a downstream end, the upstream end being connected to the downstream end of the zone of converging diameter, the transition including at least one port to allow the introduction of a feedstock;

an apparatus for introducing a fluid stream into the reactor in a direction axial to the flow of a process stream in the reactor, the apparatus having an upstream and a downstream end, the upstream end being connected to the downstream end of the transition zone;

a reaction zone having an upstream and a downstream end, the upstream end being connected to the downstream end of the transition zone or zones, a quench zone having an upstream and a downstream end, the upstream end being connected to the downstream end of the reaction zone, the quench zone including at least one port to allow the introduction of a quenching fluid; and apparatus for separating and collecting carbon black connected to the downstream end of the quench zone or zones.

The apparatus for introducing a fluid stream into the reactor in an axial direction may comprise a hollow vessel; at least one inlet, preferably a plurality of inlets, for introducing a fluid stream into the interior of the vessel and an outlet to allow the fluid stream to exit from the vessel. The outlet may comprise an annulus, a plurality of annuli, a jet or a plurality of jets. The inlet(s) of the hollow vessel may be disposed radially or in an axial direction substantially parallel to the axial direction of the outlet to produce an outlet fluid stream without significant swirls. Alternatively, the inlet(s) of the hollow vessel may be disposed in a direction tangential to the axial direction of the outlet to produce an outlet fluid stream with swirls.

FIG. 1 depicts, in cross-sectional view, a modular, also referred to as a "staged", furnace carbon black reactor of the type generally disclosed in U.S. Pat. No. 3,922,335, the disclosure of which is hereby incorporated by reference. FIG. 1 illustrates a furnace carbon black reactor 2, having a first-stage 10, which has a zone of converging diameter 11; a second stage 12; and a third reactor stage 18. Feedstock 30 is injected at feedstock injection points 32 in the second stage 12 of the reactor. Quench 40, is located at point 42 in the third reactor stage 18 to introduce a quench fluid 50 into the reactor.

An apparatus of the present invention for introducing a fluid stream 70 is located downstream of the point of feedstock injection at point 72. The apparatus 70 includes inlet ports 71 and an outlet annulus 73 to introduce a fluid stream in an axial direction into the third reactor stage 18. In the depicted embodiment inlet ports 71 are disposed substantially parallel to the outlet annulus 73 to introduce the fluid stream into the reactor without swirls.

Figure 2A:
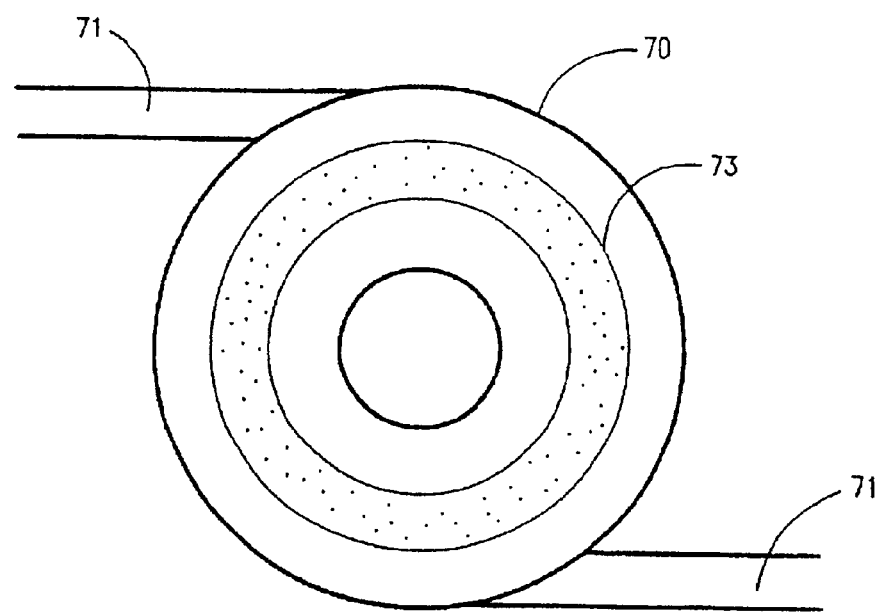
FIGS. 2a and 2b depict embodiments of apparatus of the present invention for introducing a fluid stream into a carbon black reactor.
Figure 2B:
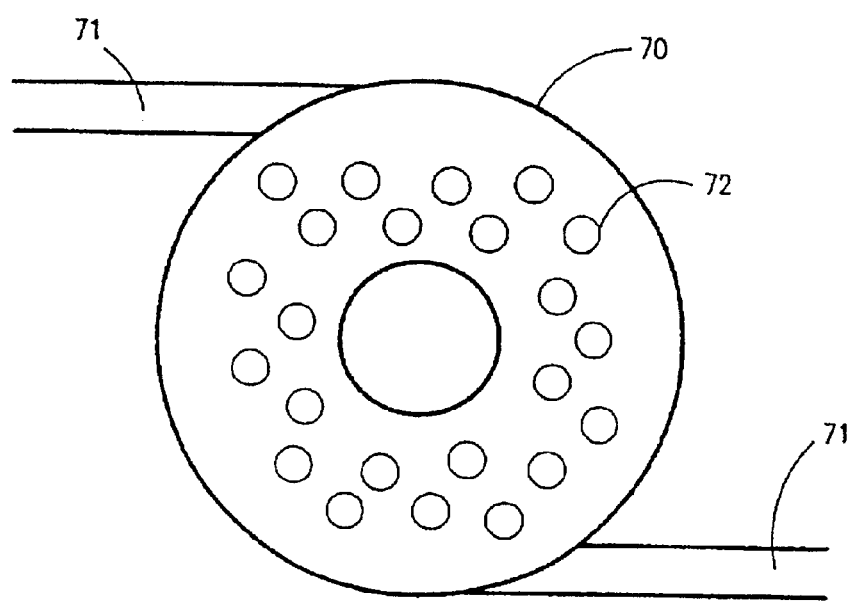

FIGS. 2a and 2b depict embodiments of an apparatus of the present invention for introducing a fluid stream into the reactor. FIG. 2a depicts an end view of an embodiment of an apparatus, 70 of the present invention for introducing a fluid stream into the reactor. The view shown is the end including an outlet annulus 73. In the embodiment shown in FIG. 2, inlet ports 71 are disposed tangentially to the annulus 73. As a result the annulus will introduce the fluid stream into the reactor with swirls.

FIG. 2b depicts an end view of an alternative embodiment of an apparatus, 70 of the present invention for introducing a fluid stream into the reactor. The view shown is the end including a plurality of outlet jets 72. In the embodiment shown in FIG. 2, inlet ports 71 are disposed tangentially to the outlet jets 72. As a result the outlet jets will introduce the fluid stream into the reactor with swirls. In addition, or alternatively, the outlet apertures for outlet jets 72 may be configured to impart swirl to the fluid stream.

Figure 3:
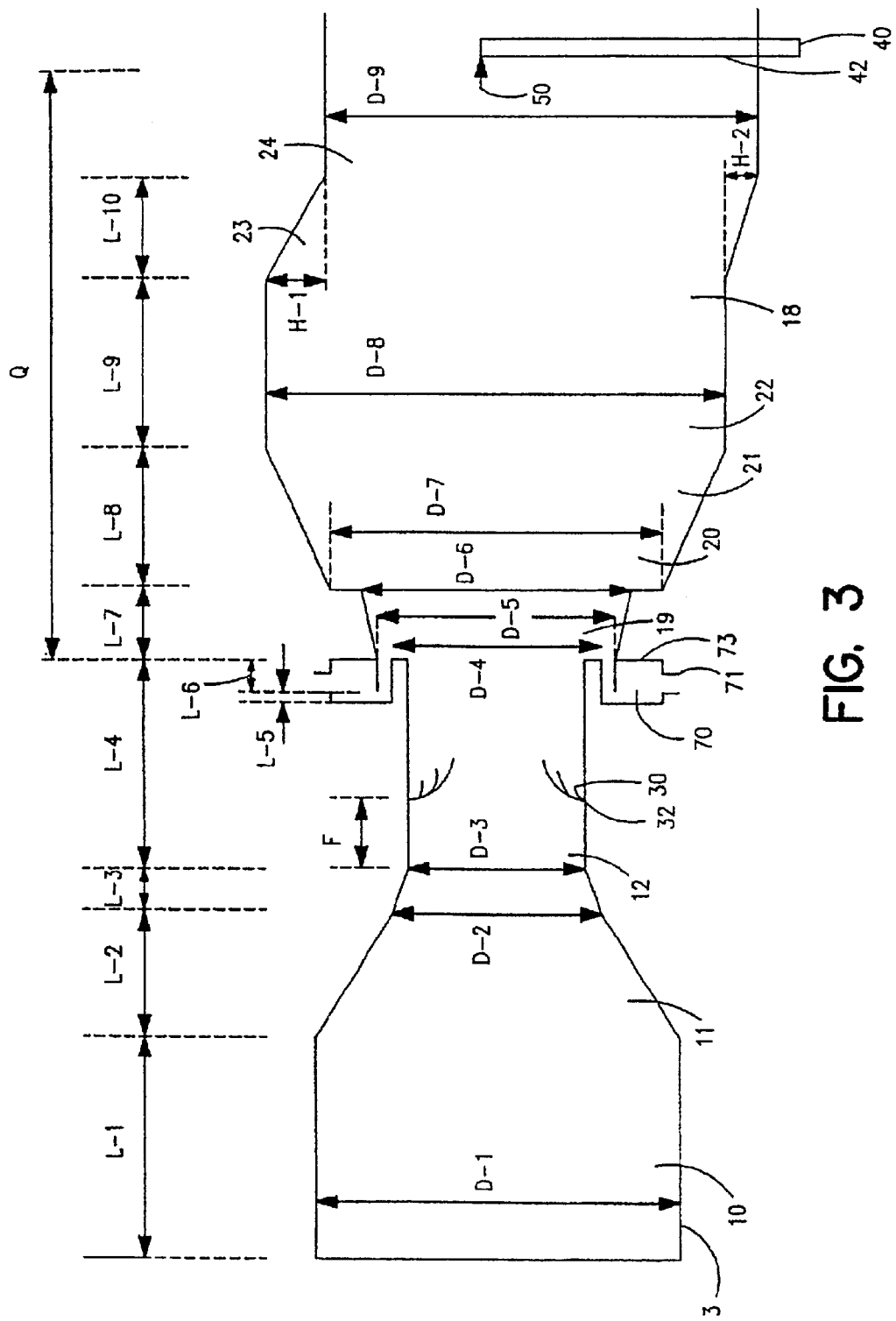
FIG. 3 is a cross-sectional view of a portion of the modular furnace carbon black reactor which was utilized in the Examples described below.

FIG. 3 depicts an alternative embodiment of a modular carbon black reactor for practicing a process of the present invention. The reactor configuration depicted in FIG. 3 was utilized in the following examples.

Referring to FIG. 3, carbon black reactor 3, has a first-stage 10, which has a zone of converging diameter 11 that includes a stepped portion; a second, feedstock injection stage 12; and a third, reactor stage 18. Feedstock 30 is injected at feedstock injection points 32 in the second stage 12 of the reactor. Quench 40, is located at point 42 in the third reactor stage 18 to introduce a quench fluid 50 into the reactor.

The diameter of the first, combustion stage, 10, up to the point where the zone of converging diameter, 11, begins is shown as D-1; the diameter at the step in zone 11 is shown as D-2, and the diameter of zone 12, as D-3. The length of the first-stage combustion zone, 10, up to the point where the zone of converging diameter, 11, begins is shown as L-1; the length of the zone of converging diameter up to the step is shown as L-2, and from the step to the beginning of the feedstock injection zone as L-3. The overall length of the feedstock injection zone is shown as L-4. The distance between the end of zone 11 and the point of feedstock injection 32 is shown as F.

The reactor 3, includes an apparatus of the present invention for introducing a fluid stream 70 located downstream of the point of feedstock injection at point 72. The apparatus 70 includes inlet ports 71 and an outlet annulus 73, as depicted in FIG. 2a, to introduce a fluid stream in an axial direction into the third reactor stage 18. In the depicted embodiment inlet ports 71 are disposed radially to annulus 73 to introduce the fluid stream into the reactor without swirls. Dimensions of apparatus 70 are shown as L-5 and L-6.

In the reactor depicted in FIG. 3 the entrance to the third reactor stage 18 includes a zone of expanding diameter 19, followed by a stepped zone 20, a zone of increasing diameter 21 and then a first zone of uniform diameter 22. After an angled portion of the reactor there is a second zone of uniform diameter 24.

D-4 represents internal diameter of the annulus 73 utilized in the introduction of the fluid stream into the reactor. D-5 represents the external diameter of the annulus 73. The diameter of zone 19 at its widest point is shown as D-6 and the length of zone 19 as L-7. The diameter of zone 21 at its narrowest point is shown as D-7 and the length of zone 21 as L-8. The diameter of zone 22 is shown as D-8 and the length of zone 22 as L-9.

The length of zone 23 is shown as L-10. The drop at the top of the reactor between zone 22 and zone 24 is shown as H-1 and the drop at the bottom of the reactor between zone 22 and zone 24 is shown as H-2. The diameter of zone 24 is shown as D-9.

The distance from the start of the third reactor stage 18 to point 42 where the quench is located is shown as Q.

Referring to FIG. 1 or FIG. 3, to produce carbon blacks, hot combustion gases are generated in combustion zone 10 by contacting a liquid or gaseous fuel with a suitable oxidant stream such as air, oxygen, mixtures of air and oxygen or the like. Among the fuels suitable for use in contacting the oxidant stream in combustion zone, 10, to generate the hot combustion gases are included any of the readily combustible gas, vapor or liquid streams such as natural gas, hydrogen, carbon monoxide, methane, acetylene, alcohol's, or kerosene. It is generally preferred, however, to utilize fuels having high content of carbon-containing components and in particular, hydrocarbons. The ratio of air to fuel varies with type of fuel utilized. When natural gas is utilized to produce the carbon blacks of the present invention, the ratio of air to fuel may be from about 10:1 to about 100:1. To facilitate the generation of hot combustion gases, the oxidant stream may be preheated.

The hot combustion gas stream flows downstream from zones 10 and 11 into zones 12 and then 18. The direction of the flow of hot combustion gases is shown by the arrow in FIG. 1 or 3. Carbon black-yielding feedstock, 30, is introduced at point 32. The distance from the end of the zone of converging diameter, 11, downstream to point 32 is shown as F. In the examples described herein, carbon black-yielding feedstock, 30, was injected through a plurality of jets which penetrate into the interior regions of the hot combustion gas stream to insure a high rate of mixing and shearing of the hot combustion gases and the carbon black-yielding feedstock so as to rapidly and completely decompose and convert the feedstock to carbon black particles and aggregates.

Suitable for use herein as carbon black-yielding hydrocarbon feedstocks, which are readily volatilizable under the conditions in the reactor, are unsaturated hydrocarbons such as acetylene; olefins such as ethylene, propylene, butylene; aromatics such as benzene, toluene and xylene; certain saturated hydrocarbons; and volatilized hydrocarbons such as kerosene's, naphthalene's, terpenes, ethylene tars, aromatic cycle stocks and the like.

The mixture of carbon black-yielding feedstock and hot combustion gases flows downstream through zone 12 into the carbon black reactor, zone 18. A fluid stream, comprising an oxidant, nitrogen, hydrogen, a hydrocarbonaceous material, or mixtures thereof, is introduced into the reaction stream in an axial direction through apparatus 70 and annulus 73 at the entrance of reactor stage 18. The fluid stream is introduced under sufficient pressure to penetrate the interior region of the reactor stage 18.

Quench 40, located at point 42, injecting quenching fluid 50, is utilized to stop the reactions in the effluent. According to the process of the present invention, quench 40, is located at a position 42 which allows reactions in the effluent to occur until carbon blacks having the desired properties are formed. Q is the distance from the beginning of zone 18 to quench point 42, and will vary according to the position of the quench.

After the mixture of hot combustion gases and carbon black yielding feedstock is quenched, the cooled gases pass downstream into any conventional cooling and separating devices whereby the carbon blacks are recovered. The separation of the carbon black from the gas stream is readily accomplished by conventional means such as a precipitator, cyclone separator or bag filter. This may be, but is not necessarily, followed by some means of densification, such as pelletization and drying.

The features and advantages of the present invention are further illustrated by the following examples.

The following testing procedures are used in the determination and evaluation of the analytical properties of the carbon blacks produced in the examples. Iodine number ($I_2$ No.) of the carbon blacks was determined according to ASTM Test Procedure D1510. The DBP (Dibutyl Phthalate Absorption number) of the carbon black pellets was determined according to the procedure set forth in ASTM D3493-86.

EXAMPLES

Experiments were conducted in a carbon black producing process in a reactor substantially as described herein, and as depicted in FIG. 3 with the geometry set forth below. In all examples, the primary fuel for the combustion reaction was natural gas supplied to the carbon black forming process at an ambient temperature of approximately 298 K (77° F). The liquid feedstocks utilized in all examples were commercially available hydrocarbon mixtures.

A fluid stream comprising combustion air was introduced without swirl in each example through apparatus 70 and annulus 73. The reactor geometry and run conditions were as follows:

| Example | 1 | 2 |
|---|---|---|
| D-1, cm | 19.0 | 19.0 |
| D-2, cm | 14.0 | 14.0 |
| D-3, cm | 10.9 | 10.9 |
| D-4, cm | 15.2 | 15.2 |
| D-5, cm | 18.7 | 18.7 |
| D-6, cm | 33.3 | 33.3 |
| D-7, cm | 76.2 | 76.2 |
| D-8, cm | 91.4 | 91.4 |
| D-9, cm | 68.6 | 68.6 |
| L-1, cm | 61.0 | 61.0 |
| L-2, cm | 30.5 | 30.5 |
| L-3, cm | 14.0 | 14.0 |
| L-4, cm | 27.6 | 27.6 |
| L-5, cm | 1.9 | 1.9 |
| L-6, cm | 5.0 | 5.0 |
| L-7, cm | 7.6 | 7.6 |
| L-8, cm | 7.6 | 7.6 |
| L-9, cm | 621.0 | 621.0 |
| L-10, cm | 61.0 | 61.0 |
| H-1, cm | 34.3 | 34.3 |
| H-2, cm | 11.4 | 11.4 |
| F, cm | 2.5 | 2.5 |
| Q, m | 10.7 | 10.7 |
| Point 32, Tips # and Size, mm | 6 × 1.32 | 6 × 1.78 |
| Feedstock rate, kgh | 677 | 728 |
| Feedstock Temp. C | 176 | 179 |
| K+ addition, ppm Feedstock | 8 | 8 |
| Total Air, nm³h | 1870 | 1879 |
| Primary Comb. Air, nm³h | 1832 | 1315 |
| Primary Comb. Air, Temp. C. | 402 | 402 |
| Primary Nat. Gas, nm³h | 76 | 54 |
| Primary Nat. Gas Temp. C. | 15 | 15 |
| Air/Gas Burn Ratio | 9.85 | 9.85 |
| Fluid Injection nm³h | 38 | 564 |
| Burner Equivalence Ratio | 0.40 | 0.40 |
| Total Equivalence Ratio | 4.00 | 4.18 |
| % Axial Air | 2 | 30 |
| Carbon Black Properties | Example 1 | Example 2 |
| I2 No., m²/g | 30.1 | 30.0 |
| DBP, cc/100 g | 68 | 74.6 |

Examples 1–2 illustrate the effect of fluid stream addition on the structure of the carbon blacks produced by the process, as reflected by the DBP of the carbon blacks. As shown in Example 2, increasing the rate of fluid addition into reactor stage 18 results in a carbon black having an approximately 10% greater DBP in comparison to Example 1.

It should be clearly understood that the forms of the present invention herein described are illustrative only and are not intended to limit the scope of the invention. The present invention includes all modifications falling within the scope of the foregoing disclosure and the following claims.

What is claimed is:

1. A process for producing carbon black comprising: introducing a fluid stream to sheath a process stream downstream from introduction of a feedstock into the process stream, wherein the fluid stream is introduced in an axial direction, and wherein the fluid stream has a swirl pattern.

2. The process of claim 1, wherein the fluid stream comprises a gaseous stream including at least one of the following components: an oxidant, nitrogen, hydrogen, a hydrocarbonaceous material or mixtures thereof.

3. The process of claim 2 wherein the fluid stream comprises tail gas.

4. A process for producing carbon black comprising:
generating a stream of combustion gases in a first stage of a reactor having a velocity sufficient to flow through subsequent stages of the reactor and a temperature sufficient to pyrolyze a carbon black yielding feedstock, and passing said combustion gases through a zone of converging diameter having an upstream and a downstream end and converging from the upstream end towards the downstream end, injecting a carbon black yielding feedstock into the combustion gas in a second stage of the reactor to produce an effluent composed of carbon black and combustion gases;

introducing a fluid stream in a direction axial to the flow of the effluent downstream from the injection of said carbon black yielding feedstock, the resulting sheathed effluent passing through at least a portion of a third stage of the reactor, and cooling, separating, and recovering the carbon black product.

5. The process of claim 4 wherein the fluid stream is introduced so as to sheath the effluent stream entering the third stage of the reactor.

6. The process of claim 5 wherein the fluid stream has a swirl pattern.

7. The process of claim 5 wherein the fluid stream comprises a gaseous stream including at least one of the following components: an oxidant, nitrogen, hydrogen, a hydrocarbonaceous material or mixtures thereof.

8. The process of claim 7, wherein the fluid stream comprises tail gas.

9. The process of claim 4, further comprising introducing said combustion gases into a transition zone having an upstream and a downstream end, the upstream end being connected to the downstream end of the zone of converging diameter.

* * * * *